(12) United States Patent
Yoshitomi et al.

(10) Patent No.: US 12,027,851 B2
(45) Date of Patent: Jul. 2, 2024

(54) POWER CONVERSION SYSTEM, METHOD OF TRANSMITTING IP ADDRESS OF POWER CONVERTER, AND INFORMATION STORAGE MEDIUM

(71) Applicant: Kabushiki Kaisha Yaskawa Denki, Kitakyushu (JP)

(72) Inventors: Masaya Yoshitomi, Kitakyushu (JP); Kazuki Kinaga, Kitakyushu (JP)

(73) Assignee: KABUSHIKI KAISHA YASKAWA DENKI, Fukuoka (JP)

( * ) Notice: Subject to any disclaimer, the term of this patent is extended or adjusted under 35 U.S.C. 154(b) by 592 days.

(21) Appl. No.: 17/206,118

(22) Filed: Mar. 18, 2021

(65) Prior Publication Data

US 2021/0210979 A1     Jul. 8, 2021

Related U.S. Application Data

(63) Continuation of application No. PCT/JP2018/034579, filed on Sep. 19, 2018.

(51) Int. Cl.
    *H02J 13/00*     (2006.01)

(52) U.S. Cl.
    CPC .. *H02J 13/00002* (2020.01); *H02J 13/00001* (2020.01); *H02J 13/00006* (2020.01)

(58) Field of Classification Search
    CPC ........... H02J 13/00002; H02J 13/00001; H02J 13/00006; H02M 1/0012; Y02B 90/20; Y04S 40/12
See application file for complete search history.

(56) References Cited

U.S. PATENT DOCUMENTS

| | | | |
|---|---|---|---|
| 8,812,482 B1* | 8/2014 | Kapoor | G06F 16/273 707/706 |
| 9,053,146 B1* | 6/2015 | Kapoor | G06F 16/242 |
| 9,672,281 B1* | 6/2017 | Kapoor | G06F 9/45558 |
| 10,256,740 B2* | 4/2019 | Toujinbara | H02M 7/53875 |
| 10,700,528 B2* | 6/2020 | Kangas | G05B 19/0426 |
| 11,205,903 B2* | 12/2021 | Minami | H02J 3/466 |
| 2003/0040897 A1* | 2/2003 | Murphy | G05B 19/042 710/9 |

(Continued)

FOREIGN PATENT DOCUMENTS

| | | |
|---|---|---|
| JP | 2008276373 A | 11/2008 |
| JP | 2013027210 A | 2/2013 |

(Continued)

OTHER PUBLICATIONS

NPL Power Supply System English Translation ,JP 2007-318949A, Dec. 6, 2007; Watanabe et al. (Year: 2007).*

(Continued)

*Primary Examiner* — Ramesh B Patel
(74) *Attorney, Agent, or Firm* — HEA LAW PLLC

(57) ABSTRACT

Provided is a power conversion system including a plurality of power converters in a same group and being communicably connected to each other. The power conversion system is configured to generate an IP address list by acquiring an IP address of each of the plurality of power converters, store the IP address list, and transmit the IP address list to a higher-level device configured to cooperate with the plurality of power converters.

20 Claims, 8 Drawing Sheets

(56) References Cited

U.S. PATENT DOCUMENTS

| | | | | |
|---|---|---|---|---|
| 2008/0125885 A1* | 5/2008 | McNutt | H04L 1/00 | |
| | | | 700/81 | |
| 2012/0313558 A1* | 12/2012 | Lee | H02J 13/00032 | |
| | | | 370/474 | |
| 2013/0024034 A1* | 1/2013 | Iino | H02J 3/466 | |
| | | | 700/297 | |
| 2015/0063473 A1* | 3/2015 | Nishibayashi | H02J 13/00 | |
| | | | 375/257 | |
| 2015/0363481 A1* | 12/2015 | Haynes | G06Q 10/10 | |
| | | | 707/748 | |
| 2017/0126142 A1* | 5/2017 | Toujinbara | H02M 7/53875 | |
| 2017/0212717 A1* | 7/2017 | Zhang | G02B 27/017 | |
| 2017/0237265 A1* | 8/2017 | Goto | H02J 3/381 | |
| | | | 307/82 | |
| 2020/0145493 A1* | 5/2020 | Wang | H04L 67/56 | |
| 2021/0210979 A1* | 7/2021 | Yoshitomi | H02J 13/00001 | |
| 2021/0351612 A1* | 11/2021 | Fannin | G01R 31/40 | |

FOREIGN PATENT DOCUMENTS

| | | |
|---|---|---|
| JP | 2014072931 A | 4/2014 |
| JP | 2017127190 A | 7/2017 |
| JP | 2017191464 A | 10/2017 |
| JP | 2018098838 A | 6/2018 |

OTHER PUBLICATIONS

International Search Report dated Nov. 6, 2018 for PCT/JP2018/034579 with English translation pp. 1-4.

* cited by examiner

| STATUS | NAME | SERIAL NUMBER | IP ADDRESS |
|---|---|---|---|
| ? | | 1W17X2458720001 | 10.25.187.65 |

ASSIGN NAME

G2

F20

BACK    NEXT

POWER CONVERSION SYSTEM, METHOD OF TRANSMITTING IP ADDRESS OF POWER CONVERTER, AND INFORMATION STORAGE MEDIUM

CROSS-REFERENCE TO RELATED APPLICATION

The present disclosure contains subject matter related to that disclosed in International Patent Application PCT/JP2018/034579 filed in the Japan Patent Office on Sep. 19, 2018, the entire contents of which are hereby incorporated by reference.

BACKGROUND OF THE INVENTION

1. Field of the Invention

The embodiments disclosed herein relate to a power conversion system, a method of transmitting an IP address of a power converter, and an information storage medium.

2. Description of the Related Art

In JP 2017-127190 A1, there is described a system in which respective roles of a plurality of power converters in the same group and being communicably connected to each other are split between a master and a controlled machine. In the system, the power converter fulfilling the role of the master and the power converters fulfilling the role of the controlled machine communicate with each other after initial processing, for example, acquisition of an IP address, is executed.

SUMMARY OF THE INVENTION

A power conversion system according to at least one aspect of the present invention is a power conversion system including a plurality of power converters in a same group and being communicably connected to each other, the power conversion system being configured to: generate an IP address list by acquiring an IP address of each of the plurality of power converters; transmit the IP address list to a higher-level device configured to cooperate with the plurality of power converters; display an identification number assigned to each of the plurality of power converters and an operating state of each of the plurality of power converters; store a reference list including an identification number list of the identification numbers and the IP address list; display a status indicating whether each of the plurality of power converters belongs to the group; display, when the status is changed by a user instruction, the changed status; and update the reference list based on the changed status.

BRIEF DESCRIPTION OF THE DRAWINGS

FIG. 4 is a diagram for illustrating an example of a group setting screen.

FIG. 5 is a diagram for illustrating an example of an identification number assignment screen.

DESCRIPTION OF THE EMBODIMENTS

1. Overall Configuration of Power Conversion System

According to a viewpoint of the inventors of the present invention, when an operating state of each of a plurality of power converters is to be monitored by a higher-level device, there is no mechanism for notifying to the higher-level device an IP address of each power converter, and there is no way to cause the high-level device and each power converter to communicate with each other. In view of this, as a result of extensive research and development on enabling those plurality of power converters and the higher-level device to communicate with each other, the inventors of the present invention have conceived of a novel and unique power conversion system and the like. A detail description is now given of the power conversion system and the like according to at least one embodiment of the present invention.

Figure 1:
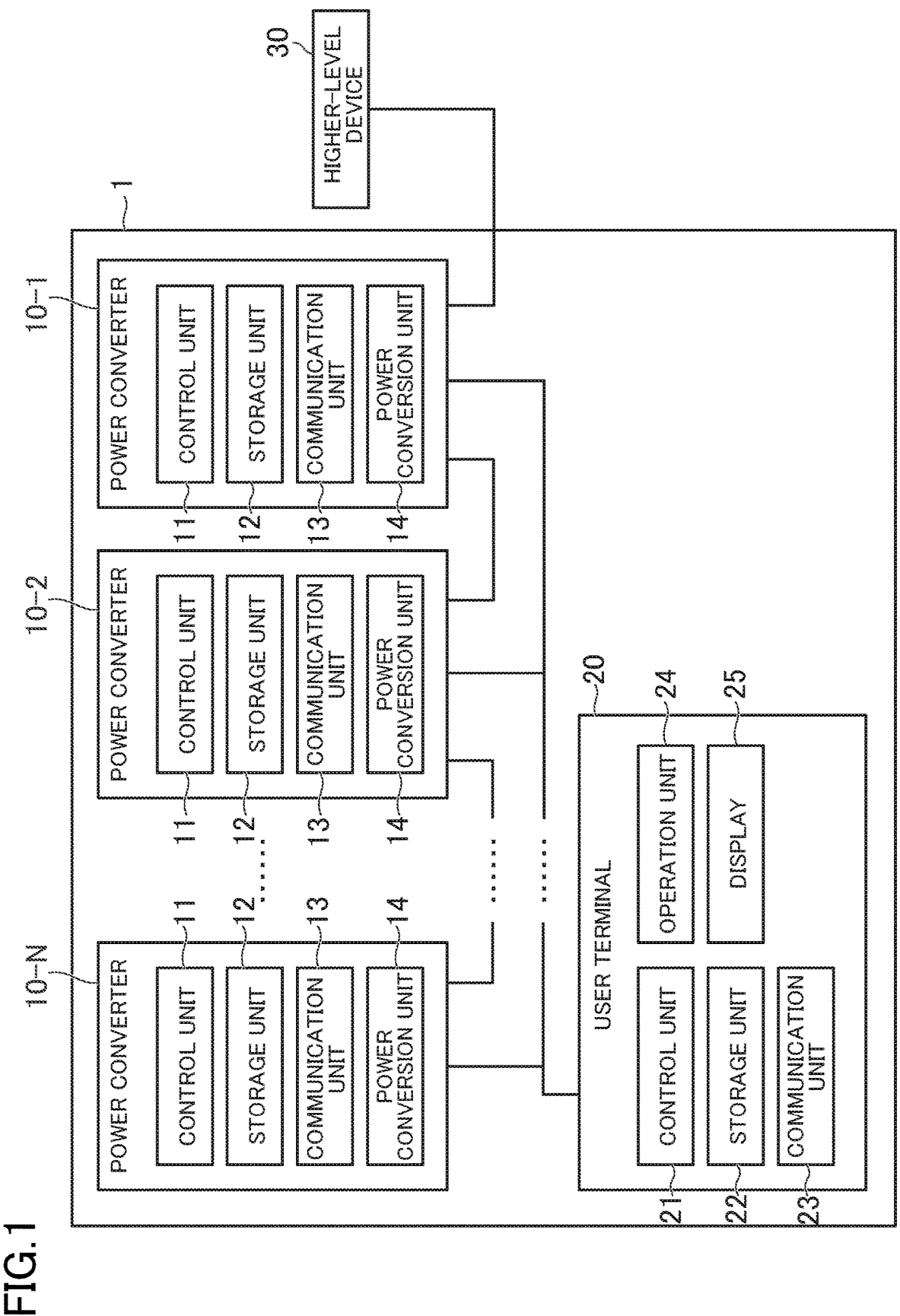
FIG. 1 is a diagram for illustrating an overall configuration of a power conversion system according to at least one embodiment of the present invention.

FIG. 1 is a diagram for illustrating an overall configuration of a power conversion system according to at least one embodiment of the present invention. As illustrated in FIG. 1, a power conversion system 1 includes power converters 10-1 to 10-N and a user terminal 20, and is connected to a higher-level device 30. In the at least one embodiment, when the power converters 10-1 to 10-N are not to be distinguished from each other, the power converters 10-1 to 10-N are simply referred to as "power converter 10." Further, N indicates the number of connected power converters 10, and may be any integer of 2 or more.

The power converter 10 is a device configured to convert electric power, and is, for example, an inverter, a converter, or a power conditioner. For example, the power converter 10 includes a control unit 11, a storage unit 12, a communication unit 13, and a power conversion unit 14.

The control unit 11 includes at least one processor. The storage unit 12 includes a volatile memory, for example, a random-access memory (RAM), and a non-volatile memory, for example, a read-only memory (ROM), an electrically erasable programmable read-only memory (EEPROM), a flash memory, or a hard disk drive. The storage unit 12 is configured to store various programs and data. The control unit 11 is configured to execute various types of processing based on those programs and data. The communication unit 13 is a communication interface for wired communication or wireless communication. Any standard can be applied to the communication interface, and, for example, Ethernet (trademark) or Wi-Fi (trademark) can be applied. The power conversion unit 14 is an electric circuit configured to modulate a voltage or a current for adjusting its frequency and amplitude.

The user terminal 20 is a computer to be operated by a user of the power conversion system 1. For example, the user terminal 20 is a personal computer, a mobile phone (including a smartphone), or a mobile terminal (including a tablet terminal). The user terminal 20 includes a control unit 21, a storage unit 22, a communication unit 23, an operation unit 24, and a display 25. The hardware configuration of each of the controller 21, the storage unit 22, and the communication unit 23 may be the same as that of the controller 11, the storage unit 12, and the communication unit 13, respectively. The operation unit 24 is an input device, for example, a mouse or a keyboard. The display 25 is, for example, a liquid crystal display or an organic EL display. The display 25 is configured to display various screens based on an instruction from the controller 11.

The programs and data described as being stored in each of the storage units 12 and 22 may be supplied to the power converter 10 or the user terminal 20 through the network. Moreover, the hardware configuration of each of the power converter 10 and the user terminal 20 is not limited to the above-mentioned example, and various types of hardware can be applied. For example, a reader (for example, optical disc drive or memory card slot) configured to read a computer-readable information storage medium and an input/output device (for example, USB terminal) configured to directly connect to an external device may be included. In this case, programs and data stored in the information storage medium may be supplied through the reader or the input/output device.

The higher-level device 30 is a computer configured to monitor an operating state of each power converter 10, and is, for example, a server computer or a personal computer. The user of the power conversion system 1 may perform the above-mentioned monitoring by using the higher-level device 30, but in the at least one embodiment, there is described a case in which an administrator different from the user of the power conversion system 1 performs the monitoring by using the higher-level device 30. The hardware configuration of the higher-level device 30 may be the same as that of the user terminal 20, and may include, for example, a control unit, a storage unit, a communication unit, an operation unit, and a display.

2. Overview of Power Conversion System

In the power conversion system 1, a plurality of power converters 10 belong to the same group as each other, and are communicably connected to each other.

A "group" is an assembling of power converters 10 connected to the same network, and is also referred to as a "cluster." In other words, the group is an assembling of power converters 10 which share information with each other, and is an assembling of power converters 10 to be monitored by the higher-level device 30. The power converters 10 in the same group can cooperate with each other, and for example, are configured to synchronize their AC voltages and make the amplitudes of their output voltages uniform. The power converters 10 in the group may be split into a master and controlled machines, and the master may transmit, for example, a synchronization instruction and an output voltage adjustment instruction to the controlled machines. The controlled machines adjust the amplitudes and frequencies of their output voltages based on the instructions from the master.

In the at least one embodiment, a part of the converters 10 in the group are directly connected to the higher-level device 30, and the other power converters 10 are indirectly connected to the higher-level device 30. The number of power converters 10 directly connected to the higher-level device 30 may be one or a plurality of power converters. However, in the at least one embodiment, it is assumed that not all of the power converters 10 are directly connected to the higher-level device 30, and at least one power converter 10 is indirectly connected.

As used herein, "directly connected" means that there is no other power converter 10 in the same group on a communication path to the higher-level device 30. For example, examples of "directly connected" include a case in which the power converter 10 and the higher-level device 30 are connected by one communication cable, and a case in which the power converter 10 and the higher-level device 30 are connected via a communication device, for example, a hub, and there are no other power converters 10 in the same group connected between the power converter 10 and the higher-level device 30. The directly connected power converter 10 acts as a gateway because the directly connected power converter 10 relays the communication of the indirectly connected power converters 10.

As used herein, "indirectly connected" means that there is another power converter 10 in the same group on the communication path to the higher-level device 30. For example, examples of "indirectly connected" include a case in which the power converter 10 is connected to the higher-level device 30 via another power converter 10 in the same group.

A connection configuration of the power converter 10 may be any configuration. In the at least one embodiment a daisy chain connection is described as an example, but a star connection may be used like in a modification example described later. In the daisy chain connection, the power converters 10 are connected in series in a predetermined connection order.

The connection order may be determined by any method, and may be, for example, the order counted from the higher-level device 30. When the power converter is closer to the higher-level device 30, the power converter has a higher connection order, and when the power converter is farther from the higher-level device 30, the power converter has a lower connection order. For example, the power converter 10 directly connected to the higher-level device 30 may have the highest connection order, and the power converter 10 on the terminal position may have the lowest connection order. In the connection example of FIG. 1, the power converter 10-1 may have the highest connection order, and the power converter 10-N may have the lowest connection order. The method of determining the connection order is not limited to setting a higher connection order when the power converter is closer to the higher-level device 30, and the connection order may be determined regardless of the proximity to the higher-level device 30.

For example, the communication unit 13 of the power converter 10 includes a higher-connection-order communication port configured to communicate with a device having a higher connection order, and a lower-connection-order communication port configured to communicate with a device having a lower connection order. In the connection example of FIG. 1, the higher-connection-order communication port of the power converter 10-1 is connected to the higher-level device 30 by a communication cable. The power converter 10-1 is directly connected to the higher-level device 30 with the other power converters 10-2 to 10-N not on the communication path to the higher-level device 30. As a result, the power converter 10-1 acts as a gateway configured to relay the communication of other power converters 10-2 to 10-N.

Further, for example, the lower-order communication port of the power converter 10-1 is connected to the upper-order communication port of the power converter 10-2 by a communication cable. In this case, the power converter 10-2 is indirectly connected to the higher-level device 30 with the power converter 10-1 on the communication path to the higher-level device 30. In the same manner, the subsequent power converters 10 up to the terminal power converter 10-N are indirectly connected in order to the higher-level device 30 by a communication cable.

The higher-level device 30 acquires the operating state from each power converter 10 connected as described above, and monitors the operating state. In this case, the higher-level device 30 can acquire the IP address of the directly connected power converter 10-1 by transmitting a DHCP request, for example, but is not able to acquire the IP addresses by the same method for the indirectly connected power converters 10-2 to 10-N.

In view of this, the power conversion system 1 stores, in the power converter 10-1, a list of the IP addresses of all the power converters 10 in the group, and causes the list to be transmitted to the higher-level device 30. This enables the higher-level device 30 to grasp the IP addresses of all the power converters 10 in the group, and as a result, the higher-level device 30 can communicate with each power converter 10. The details of the power conversion system 1 are now described.

3. Functions to be Implemented by Power Converter System

Figure 2:
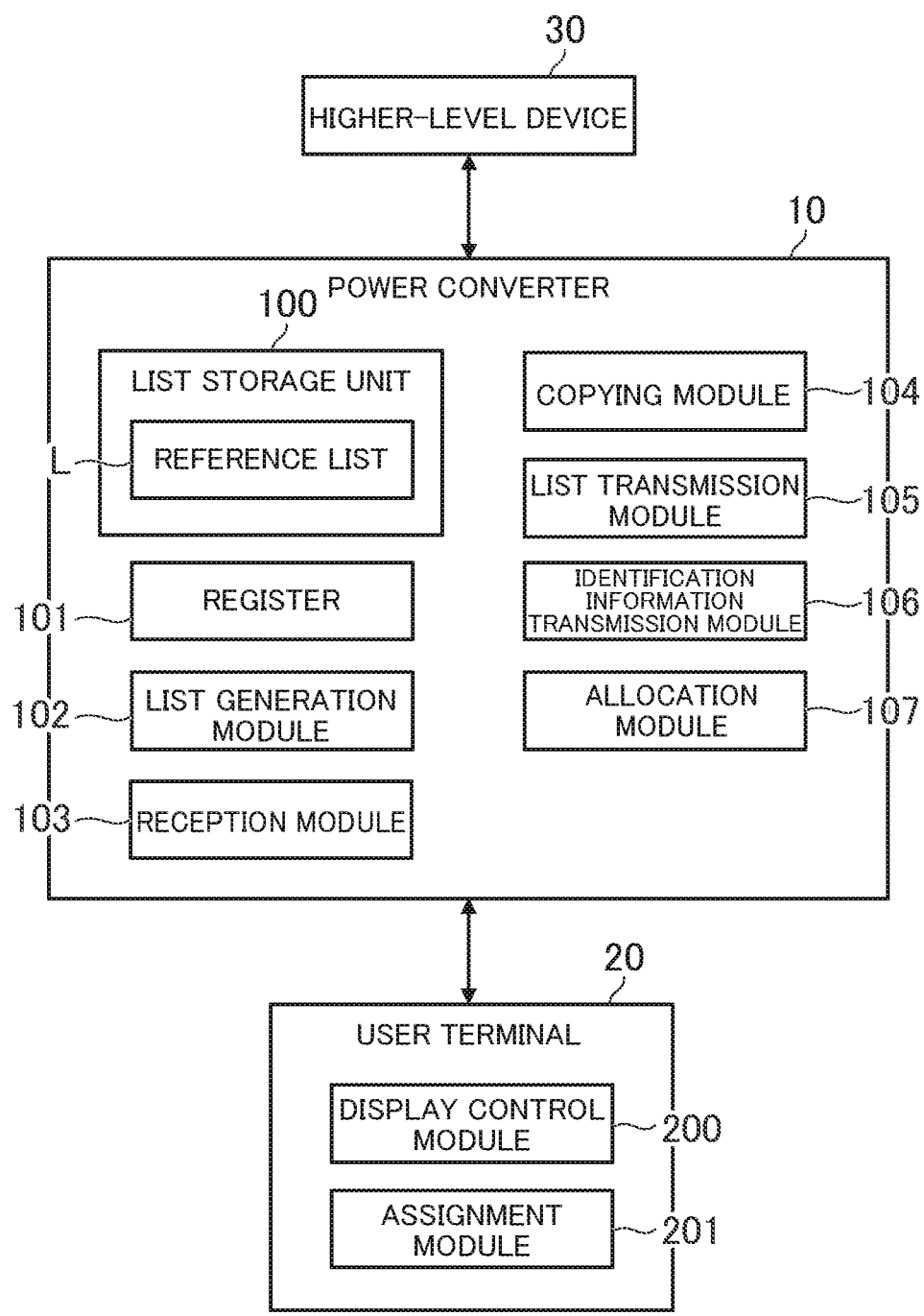
FIG. 2 is a functional block diagram for illustrating functions to be implemented by the power conversion system.

FIG. 2 is a functional block diagram for illustrating functions to be implemented by the power conversion system 1. There is now given description of the functions to be implemented by the power converter 10 and the functions to be implemented by the user terminal 20, as illustrated in FIG. 2.

3-1. Functions to be Implemented by Power Converter

In the power converter 10, a list storage unit 100, a list generation module 102, a reception module 103, a copying module 104, a list transmission module 105, an identification information transmission module 106, and an allocation module 107 are implemented, and a register 101 is secured in a storage area different from the list storage unit 100.

In the at least one embodiment, there is described a case in which the power converters 10 in the group have the same functions, but the functions of the power converters 10 may be different. The functions may be different depending on the power converter 10, so that, for example, the power converter 10-1 directly connected to the higher-level device 30 may have all the functions illustrated in FIG. 2, and the power converters 10-2 to 10-N indirectly connected to the higher-level device 30 may have only a part of the functions illustrated in FIG. 2 (for example, list storage unit 100, list generation module 102, and identification information transmission module 106).

List Storage Unit

The list storage unit 100 is mainly implemented by the storage unit 12. The list storage unit 100 is configured to store the data required for communication between each power converter 10 and the higher-level device 30. For example, the list storage unit 100 stores a reference list L which stores information on each power converter 10 in the group.

Figure 3:
FIG. 3 is a table for showing a data storage example of a reference list.

FIG. 3 is a table for showing a data storage example in the reference list L. The reference list L is generated by an operation by the user on a group setting screen (FIG. 4), which is described later, and is a list for sharing information on each power converter 10 in the group. As shown in FIG. 3, for example, the reference list L includes an identification number list, a serial number list, and an IP address list, and stores combinations of an identification number, a serial number, and an IP address of each power converter 10.

The identification number list stores the identification number of each power converter 10. The identification number is the name of the power converter 10 assigned by an assignment module 201, which is described later. The identification number is set so as not to be the same as the identification numbers of the other power converters 10 in the group, and is information that enables the power converters 10 in the group to be uniquely identified. The identification number may include characters as well as numerical values. The identification number may be changed by an operation by the user after being assigned to the power converter 10. Further, in the at least one embodiment, it is assumed that the identification number is not set at a time of shipment of the power converter 10, but the identification number may be set at the time of shipment.

The serial number list stores the serial number of each power converter 10. The serial number is an identification number for identifying an individual of the power converters 10, and is, for example, already assigned at the time of shipment of the power converter 10. The serial number is set so as not to be the same as the serial numbers of the other power converters 10 manufactured by a manufacturer, and is information that can identify only one of all the power converters 10 manufactured by the manufacturer. In principle, the serial number is not changed after being assigned to the power converter 10.

The IP address list stores the IP address of each power converter 10. In the at least one embodiment, it is assumed that the IP address is already assigned at the time of shipment of the power converter 10, but the IP address may be set after the power converter 10 is received by the user. For example, the IP address may be manually set by the user from the user terminal 20, or may be dynamically allocated by a device having a DHCP function (for example, a DHCP server, another power converter 10, or the user terminal 20).

The information stored in the reference list L is not limited to the example described above. Any information may be stored in the reference list L, and for example, information on a status, a MAC address, or a group name of each power converter 10 may be stored. Further, although the contents of the reference list L are shown in a table format in FIG. 3, any data format, for example, a text format or a CSV format, can be applied to the reference list L.

The IP address list is not required to be stored in the reference list L, and the list storage unit 100 may store the IP address list separately from the reference list L. Similarly, the identification number list and the serial number list are not required to be stored in the reference list L, and may be stored separately from the reference list L.

List Generation Module

The list generation module 102 is mainly implemented by the control unit 11. The list generation module 102 is configured to acquire the IP address of each of the plurality of power converters 10 and to generate the IP address list. Each power converter 10 stores an own IP address. Each power converter 10 shares the IP address within the group by using a communication protocol, for example, TCP/IP, to notify the other power converters 10 of the IP address. The list generation module 102 generates the IP address list including the shared IP addresses of each of the power converters 10.

In the at least one embodiment, the identification number and the serial number are shared together with the IP address. For example, the list generation module 102 generates an identification number list including the shared identification number of each of the power converters 10 and a serial number list including the shared serial number of each of the power converters 10. In the at least one embodiment, each list is included in the reference list L, and therefore the list generation module 102 generates a reference list L including the identification number list, the serial number list, and the IP address list.

The identification number, the serial number, and the IP address may be shared at any timing. For example, the identification number, the serial number, and the IP address may be shared at the time of connecting to the network (when the communication cable is connected), or may be shared when the power is turned on. As another example, the identification number, the serial number, and the IP address may be shared when the user performs an operation to share the identification number, the serial number, and the IP address from the user terminal 20, or the identification number, the serial number, and the IP address may be shared periodically.

Reception Module

The reception module 103 is mainly implemented by the control unit 11. In the at least one embodiment, there is described a case in which the IP address list is transmitted in response to an IP address request which is a request from the higher-level device 30 to acquire the IP address list, but like in the modification example described later, the power converter 10 may autonomously transmit the IP address list to the higher-level device 30.

The IP address request is information having a predetermined format including an identifier indicating that the IP address is to be acquired. The higher-level device 30 may transmit the IP address request at any timing. For example, the higher-level device 30 may transmit the IP address request when a predetermined operation is performed, or the higher-level device 30 may transmit the IP address request when initial communication is to be performed, or periodically.

The predetermined operation may be an operation determined in advance, and is performed by selecting, for example, a button or an icon on a screen displayed on the higher-level device 30. For example, the predetermined operation corresponds to selecting, on a screen for adding or changing the power converter 10, a button or icon for adding or changing the power converter 10. As another example, the predetermined operation corresponds to selecting, on a screen for performing an initial setting required for operation of the higher-level device 30, a predetermined button or icon. Further, for example, the predetermined operation corresponds to selecting, on a screen for newly acquiring or updating the IP address list, a button or icon for newly acquiring or updating the IP address list.

The initial communication is the communication performed at the time of establishing communication between the power converter 10 and the higher-level device 30. In the initial communication, communication is established in accordance with a procedure defined by a communication protocol. The initial communication may be executed at any timing. For example, the initial communication is performed when the power is turned on, when the communication function is activated, when the communication cable is plugged in, or when a predetermined time arrives. In the at least one embodiment, the IP address of the higher-level device 30 is allocated by the allocation module 107, which is described later, and therefore the initial communication corresponds to the time at which the IP address is allocated.

As used herein, "periodically" has the same meaning as "cyclically," and means that an IP address request is transmitted at regular time intervals. When the IP address request is transmitted periodically, the transmission interval may be any length, for example, a few minutes to a few hours, or a few days to a few months. For example, the higher-level device 30 executes time calculation processing by using a real-time clock, for example, and determines whether or not the timing to transmit the IP address request has arrived. The higher-level device 30 transmits the IP address request when the higher-level device 30 determines that the timing has arrived.

In the at least one embodiment, the IP address list stored in the list storage unit 100 is copied to the register 101 by the copying module 104, which is described later, and therefore a reference request which is a request to refer to the register 101 corresponds to the IP address request.

The reference request is information having a predetermined format including an identifier indicating that the register 101 is to be referred to, and includes the address of the register 101 to be referred to. The higher-level device 30 grasps in advance the address of the register 101 in which the IP address list is stored, and transmits the reference request based on the address. The reception module 103 receives the reference request from the higher-level device 30.

Copying Module

The copying module 104 is mainly implemented by the control unit 11. In the at least one embodiment, the register 101 is secured in a storage area different from the list storage unit 100, and the copying module 104 is configured to copy the IP address list of the list storage unit 100 to the register 101.

As used herein, "different storage area" means that the memory itself is different, or an address band in the memory is different. In the at least one embodiment, the list storage unit 100 is secured in the non-volatile memory of the storage unit 12, and the register 101 is secured in the volatile memory of the storage unit 12. The list storage unit 100 and the register 101 are accordingly secured in different memories from each other. The copying module 104 copies the IP address list recorded in the list storage unit 100 in the non-volatile memory to the register 101 in the volatile memory.

As used herein, "secure" means allocating an available address in the memory. The address of the register 101 may be a predetermined address, and for example, an address band capable of storing IP addresses of the maximum number (for example, from about 50 to about 100) of connectable power converters 10 is allocated. When the IP address list is copied to the register 101, it is not required to use the entire area of the register 101, and an empty area may be produced. At that time, the copying module 104 copies the IP address list by packing it in the area in the register 101 whose addresses start, for example, from the address having the smallest number.

In the at least one embodiment, the reference request to refer to the register 101 corresponds to the IP address request, and therefore when the reference request is received from the higher-level device 30, the copying module 104 copies the IP address list to a predetermined register 101 before transmission of the IP address list by the list transmission module 105 to the higher-level device 30.

As used herein, "before transmission of the IP address list" refers to before the IP address is transmitted. The IP address list stored in the list storage unit 100 is not transmitted directly to the higher-level device 30 after receiving the IP address request, the IP address is first copied to the register 101, and then the IP address list in the register 101 is transmitted.

In the at least one embodiment, a shell to be executed when receiving the reference request is prepared. The shell describes a procedure for copying the IP address list to the register 101 and a procedure for transmitting the IP address list copied to the register 101. The copying module 104 executes the former of those two procedures, and the list transmission module 105, which is described later, executes the latter of those two procedures. The shell is executed in response to receiving the reference request, and the copying module 104 copies the IP address list of the list storage unit 100 to the register 101.

The timing at which the IP address list is copied is not limited to the example described above. The IP address list may be copied at any timing, and may be copied in advance before the reference request is received. For example, the copying module 104 may copy the IP address list when the allocation module 107, which is described later, allocates the IP address to the higher-level device 30, or may copy the IP address list when the power converter 10 is powered on. As another example, the copying module 104 may periodically copy the IP address list.

List Transmission Module

The list transmission module 105 is mainly implemented by the control unit 11. The list transmission module 105 is configured to transmit the IP address list to the higher-level device 30 cooperating with the plurality of power converters 10. The list transmission module 105 is required to identify the IP address of the higher-level device 30 when transmitting the IP address list. However, in the at least one embodiment, the IP address of the higher-level device 30 is dynamically allocated by the allocation module 107, which is described later, and therefore the list transmission module 105 transmits the IP address list based on the IP address of the higher-level device 30 allocated by the allocation module 107.

When the IP address of the higher-level device 30 is not dynamically allocated, and is a static IP address, the respective IP addresses are exchanged in accordance with the procedure defined by the communication protocol during initial communication. In this case, the list transmission module 105 transmits the IP address list based on the IP address of the higher-level device 30 acquired at the time of exchange.

In the at least one embodiment, any one of the plurality of power converters 10 is directly connected to the higher-level device 30. At least the power converter 10-1 directly connected to the higher-level device 30 includes the list transmission module 105, and transmits the IP address list to the higher-level device 30. In the connection example of FIG. 1, the power converter 10-1 having the highest connection order is directly connected to the higher-level device 30, and therefore at least the power converter 10-1 includes the list transmission module 105. In the at least one embodiment, the other power converters 10-2 to 10-N, which are indirectly connected to the higher-level device 30, also include the list transmission module 105, and are capable of transmitting the IP address list even when, for example, the connection order of the power converters 10 is switched and any one of the power converters 10 is directly connected to the higher-level device 30, but those other power converters 10-2 to 10-N are not particularly required to include the list transmission module 105.

For example, the list transmission module 105 transmits the IP address list to the higher-level device 30 when the IP address request is received from the higher-level device 30. The list transmission module 105 transmits the IP address list to the higher-level device 30 in response to receiving the IP address request from the higher-level device 30 (that is, as a response to the IP address request).

In the at least one embodiment, the reference request to refer to the register 101 corresponds to the IP address request, and therefore the list transmission module 105 transmits the IP address list to the higher-level device 30 when the reference request is received from the higher-level device 30. The list transmission module 105 transmits the IP address list to the higher-level device 30 in response to receiving the reference request from the higher-level device 30 (that is, as a response to the reference request). For example, a shell is executed in response to receiving the reference request, and the list transmission module 105 transmits the IP address list copied to the register 101.

In the at least one embodiment, the list transmission module 105 transmits the IP address list to the higher-level device 30 when the initial communication to/from the higher-level device 30 is to be performed. As described above, at the time of the initial communication, communication is established in accordance with the procedure defined by the communication protocol. In the procedure, a procedure in which the higher-level device 30 transmits a reference request is included. The higher-level device 30 transmits the reference request at the time of the initial communication in accordance with the procedure defined by the communication protocol. The list transmission module 105 transmits the IP address list to the higher-level device 30 when the reference request is received at the time of the initial communication.

The timing at which the IP address list is transmitted is not limited to the example described above. The IP address list may be transmitted at any timing. For example, the IP address list may be transmitted in response to a reference request transmitted when a predetermined operation is performed on the higher-level device 30, or the IP address list may be transmitted in response to a reference request periodically transmitted from the higher-level device 30.

Identification Information Transmission Module

The identification information transmission module 106 is mainly implemented by the control unit 11. The identification information transmission module 106 is configured to transmit the identification information of the power converter 10 in which the identification information transmission module 106 is included to the higher-level device 30 after the IP address list is transmitted.

The identification information may be any information enabling the power converter 10 to be identified, and is, for example, the identification number or the serial number. In the at least one embodiment, there is described a case in which the identification number and the serial number are both included in the identification information. However, only one of the identification number and the serial number may be included in the identification information, and other information may also be included in the identification information. The identification number and the serial number are stored in the reference list L, and therefore the identification information transmission module 106 acquires identification information including the own identification number stored in the identification number list of the reference list L and an own serial number stored in the serial number list of the reference list L.

In the at least one embodiment, the identification information transmission module 106 transmits the own identification information to the higher-level device 30 when an identification information request which is a request to acquire identification information is received from the higher-level device 30. The identification information transmission module 106 transmits the identification information of the power converter in which the identification information module 106 is included to the higher-level device 30 in response to receiving the identification information request from the higher-level device 30 (that is, as a response to the identification information request).

The identification information request is information having a predetermined format and including an identifier indicating that the identification information is to be acquired. The higher-level device 30 may transmit the request to acquire identification information at any timing. For example, the identification information request may be transmitted when a predetermined operation is performed, or the identification information request may be transmitted when initial communication is to be performed, or periodically. For example, the higher-level device 30 transmits the identification information request to each power converter 10 after the IP address list is acquired.

Similarly to the IP address list, the identification information may be copied to the register and then transmitted. It is assumed that the register to which the identification information is copied has an address different from the register 101 to which the IP address list is copied, and that the higher-level device 30 grasps the address. In this case, the identification information request is a request to refer to the register to which the identification information is copied, and includes the address of the register. When the identification information transmission module 106 receives the identification information request from the higher-level device 30, the identification information transmission module 106 copies the identification information to the register and transmits the identification information. In this case as well, similarly to the case of the IP address list, the identification information may be copied and transmitted by executing a shell.

The timing at which the identification information is transmitted is not limited to the example described above. Similarly to the IP address list, the identification information may be transmitted at any timing. For example, the identification information transmission module 106 may periodically transmit the identification information to the higher-level device 30, or may transmit the identification information to the higher-level device 30 when the user performs a predetermined operation from the user terminal 20. As another example, the list transmission module 105 may transmit the IP address list to the higher-level device 30 when the reference list L is updated. Further, for example, the list transmission module 105 may transmit the identification information to the higher-level device 30 when a power converter 10 is added or replaced from a group setting screen (FIG. 4) described later (that is, when the user performs an operation of adding or replacing a power converter 10 from the user terminal 20).

Allocation Module

The allocation module 107 is mainly implemented by the control unit 11. The allocation module 107 is configured to dynamically allocate an IP address to the higher-level device 30. In the at least one embodiment, the higher-level device 30 serves as a DHCP client, and the power converter 10 serves as a DHCP server. For the IP address allocation method itself, the method used in DHCP may be employed.

When the allocation module 107 receives an allocation request from the higher-level device 30, the allocation module 107 allocates an IP address to the higher-level device 30 by using the DHCP function. The allocation request is a DHCP request. The power converter 10 holds a list of IP addresses that can be allocated. The allocation module 107 refers to the list and allocates an available IP address to the higher-level device 30. Each of the plurality of power converters 10 communicates with the higher-level device 30 based on the IP address of the higher-level device 30 allocated by the allocation module 107.

3-2. Functions to be Implemented in User Terminal

In the user terminal 20, a display control module 200 and an assignment module 201 are implemented.

Display Control Module

The display control module 200 is mainly implemented by the control unit 21. The display control module 200 is configured to display on the display 25 various screens for executing the setting for the power converter 10 and managing the operating state. There is described here, as an example of the screens displayed by the display control module 200, a group setting screen and an identification number assignment screen.

Figure 4:
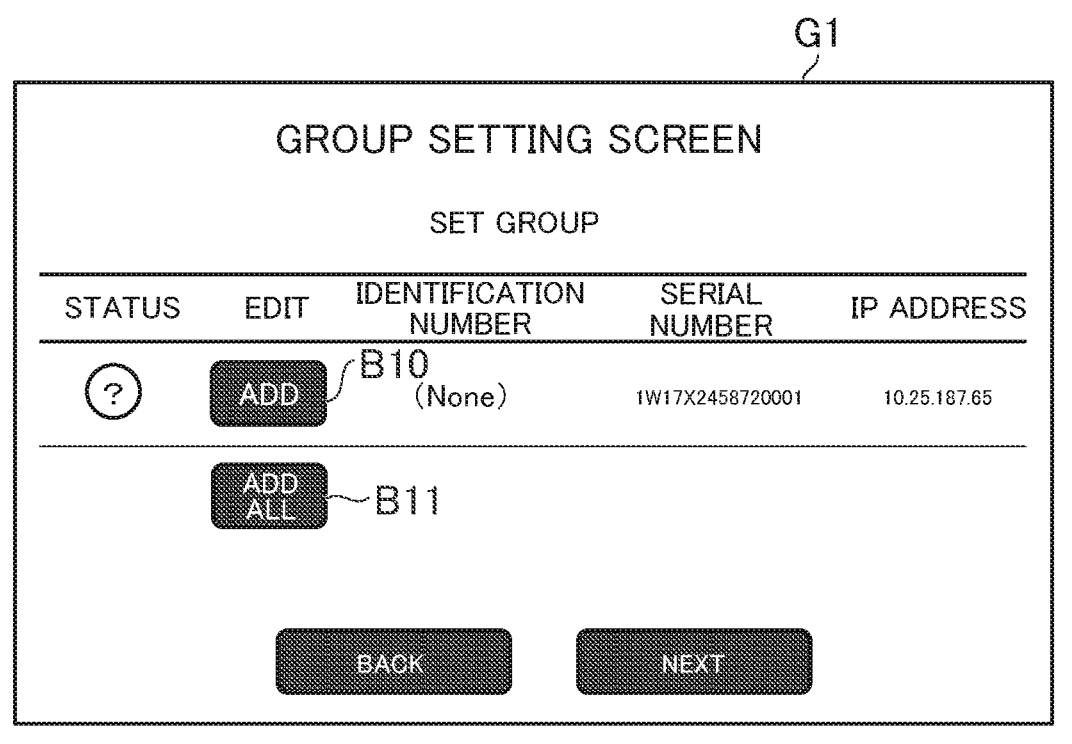

FIG. 4 is a diagram for illustrating an example of the group setting screen. As illustrated in FIG. 4, a group setting screen G1 is a screen for executing a setting for a power converter 10 belonging to the group. For example, when the user terminal 20 and the power converter 10 are connected by wire or wirelessly, the display control module 200 acquires a status, the serial number, and the IP address of the power converter 10, and displays the acquired status, serial number, and IP address on the group setting screen G1. The status is information on whether the power converter 10 is a power converter 10 that has already been added to the group or is a new power converter 10 that has not been added to the group.

In FIG. 4. there is illustrated an example of a screen displayed when a first setting for the power converter 10 is executed. The identification number of the power converter 10 is set after the identification number is received by the user, and therefore the identification number of the power converter 10 is not displayed on the group setting screen G1 of FIG. 4. The group setting screen G1 can be displayed even after the first setting, and when the identification number of the power converter 10 has been assigned at that point, the identification number is displayed on the group setting screen G1.

On the group setting screen G1, buttons B10 and B11 for adding the displayed power converters 10 to the group are displayed. When the user selects the button B10, one power converter 10 corresponding to the button B10 is added to the group. When the user selects the button B11, all the power converters 10 displayed on the group setting screen G1 are added to the group. When the power converter 10 is added to the group, the information on the identification number, the serial number, and the IP address is shared and the reference list is updated.

The group setting screen G1 is not limited to the example of FIG. 4, and for example, a button or the like for removing a power converter 10 from the group may be displayed. When a power converter 10 is to be replaced, the power converter 10 is removed from the group and added to a new group.

FIG. 5 is a diagram for illustrating an example of the identification number assignment screen. As illustrated in FIG. 5, an identification number assignment screen G2 is a screen for assigning an identification number to the power converter 10. Similarly to the group setting screen G1, the identification number assignment screen G2 may be displayed at the time of first setting or may be displayed after the first setting.

On the identification number assignment screen G2, an input form F20 for inputting an identification number is displayed. The identification number which is the number input by the user in the input form F20 is assigned to the power converter 10. The input form F20 may be configured such that any number can be input from the operation unit 24, or such that a series of predetermined number is displayed in a pull-down format. In the case of displaying a pull-down format, the pull-down format may be configured such that, among the predetermined numbers, only available numbers that are not assigned to any other power converter 10 are displayed.

In FIG. 5, there is illustrated a case in which an identification number is assigned to one power converter 10, but an identification number may be assigned to each of the plurality of power converters 10. Further, the identification number may be assigned in order of the connection order of the daisy chain connection, or may be assigned without considering the connection order in particular. For example, the number "3" of the identification number may be assigned to the power converter 10-1 having the highest connection order.

Assignment Module

The assignment module 201 is mainly implemented by the control unit 21. The assignment module 201 is configured to assign an identification number to each of the plurality of power converters 10. For example, the assignment module 201 assigns the identification number input by the user from the operation unit 24 to the power converter 10. In the at least one embodiment, the identification number is input from the input form F20 of the identification number assignment screen G2, and therefore the assignment module 201 assigns the identification number input in the input form F20 to the power converter 10.

The identification number may be automatically assigned based on a predetermined algorithm in place of being manually assigned by the user. For example, a list of identification numbers may be held in the user terminal 20, and the assignment module 201 may automatically assign an available identification number to the power converter 10. For example, the assignment module 201 may assign the identification number of each power converter 10 such that the identification numbers are in series, or may assign the identification number of each power converter 10 such that the identification numbers are not particularly in series.

When the identification number is assigned by the assignment module 201, the display control module 200 sorts the identification numbers assigned to each of the plurality of power converters 10 in ascending or descending order, and displays the operating state of each of the plurality of power converters 10. For example, the display control module 200 displays the operating state of each power converter 10 such that the identification numbers are arranged in ascending or descending order from top to bottom of the screen. As another example, the display control module 200 displays the operating state of each power converter 10 such that the identification numbers are arranged in ascending or descending order from left to right (or right to left) of the screen. The operating state is information to be monitored, and may be, for example, information on a voltage value or frequency output by the power converter 10, or presence or absence of an abnormality detected by the power converter 10. The display control module 200 may transmit to each power converter 10 an operating state request to acquire the operating state based on the IP address list, and acquire the operating state from each power converter 10.

4. Processing to be Executed in Power Conversion System

Figure 6:
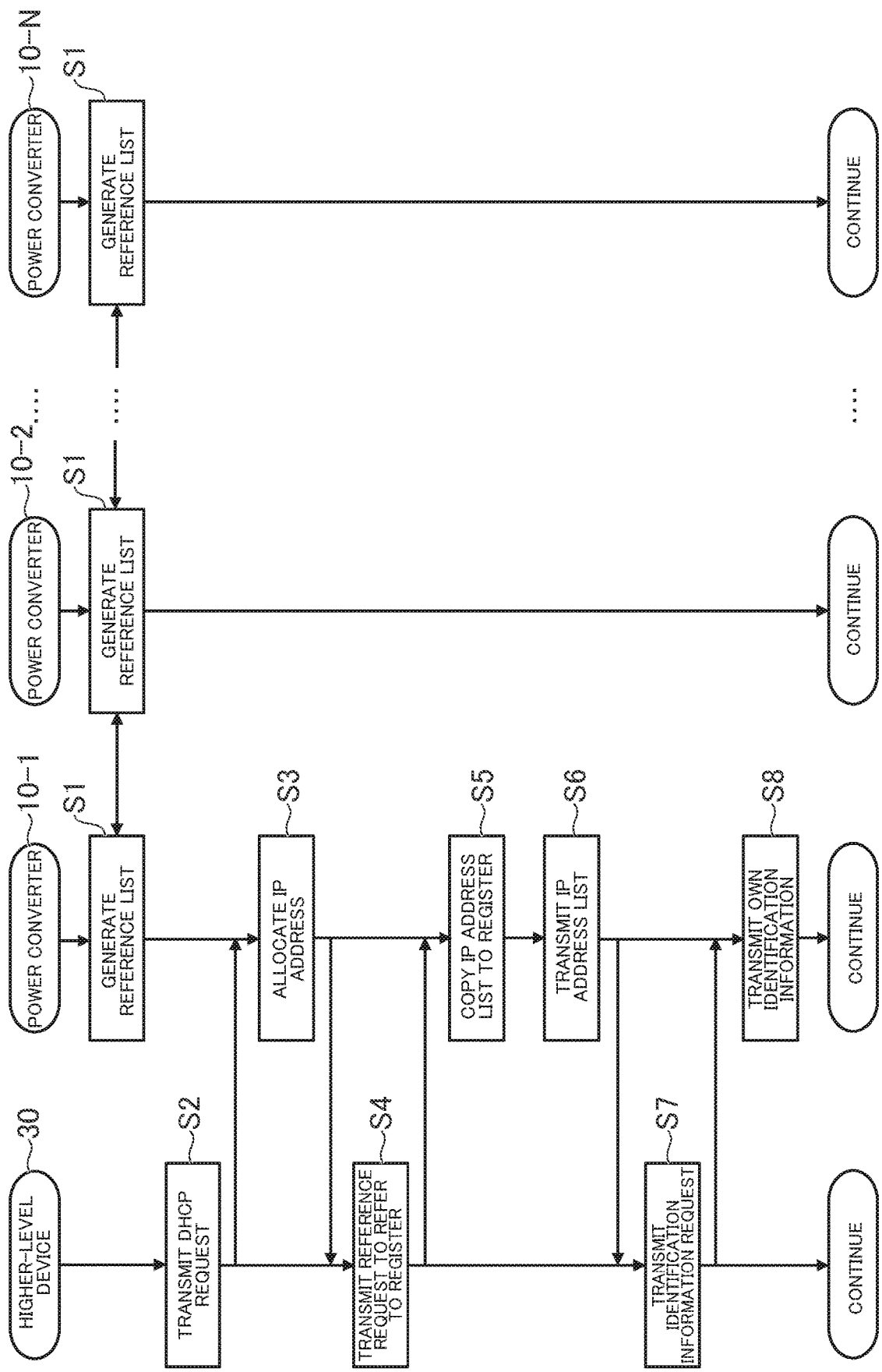
FIG. 6 is a flowchart for illustrating processing to be executed by the power conversion system.
Figure 7:
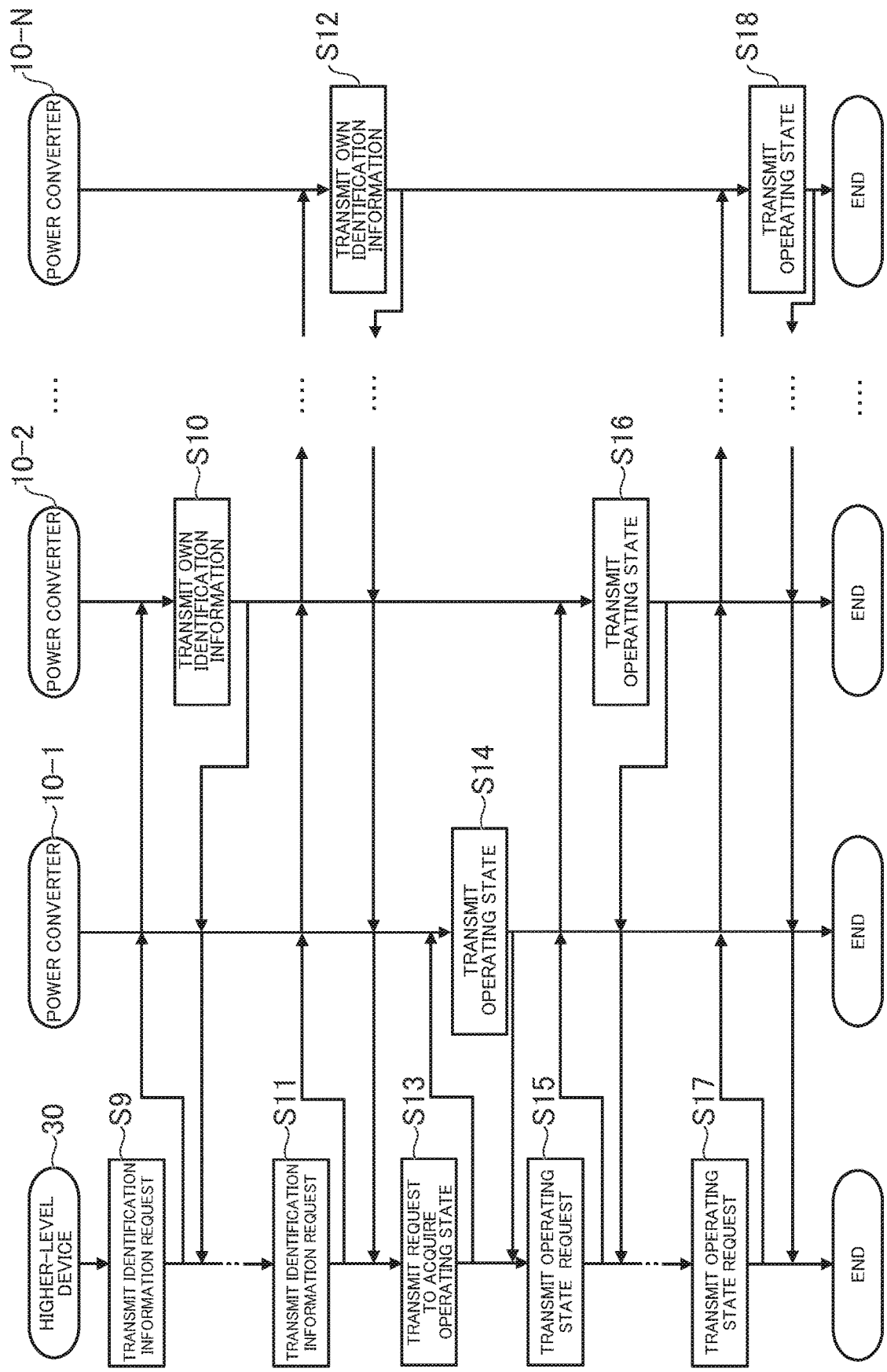
FIG. 7 is a flowchart for illustrating processing to be executed by the power conversion system.

FIG. 6 and FIG. 7 are flowcharts for illustrating processing to be executed in the power conversion system 1. The processing illustrated in FIG. 6 and FIG. 7 is executed in the power converter 10 by the control unit 11 operating in accordance with programs stored in the storage unit 12, and the higher-level device 30 operating in accordance with programs stored in the higher-level device 30. The processing illustrated in FIG. 6 and FIG. 7 is an example of processing executed by the functional blocks illustrated in FIG. 2. It is assumed that when the processing illustrated in FIG. 6 and FIG. 7 is executed, each power converter 10 already belongs to the group and the identification numbers have been assigned by a user operation on the group setting screen G1 and the identification number assignment screen G2.

As illustrated in FIG. 6, information such as the identification number, the serial number, and the IP address are shared among the power converters 10 and a reference list L is generated (Step S1). In Step S1, each power converter 10 transmits its own identification number, serial number, and IP address stored in the storage unit 12 to another power converter 10, and receives from the another power converter 10 the identification numbers, serial numbers, and IP addresses of the other power converters 10. Each power converter 10 generates a reference list L including the own identification number, serial number, and IP address, and the identification number, serial number, and IP address of the another power converter 10, and records the generated reference list L in the storage unit 12.

The higher-level device 30 transmits a DHCP request to the power converter 10-1 which is directly connected to the higher-level device 30 (Step S2). The processing from Step S2 and subsequent steps is processing to be executed at the time of initial communication, and the procedure of each processing step is defined in the communication protocol. The DHCP request may be transmitted at a predetermined timing such as when the power is turned on, when the communication function is activated, when the communication cable is plugged in, or when the administrator performs an operation.

When the power converter 10-1 receives the DHCP request, the control unit 11 allocates an IP address to the higher-level device 30 (Step S3). A list of the IP addresses that can be allocated to the higher-level device 30 is stored in the storage unit 12 in advance. In Step S3, the control unit 11 allocates an IP address that has not yet been allocated in the list to any device, and changes the allocated IP address to "used." After the IP address has been allocated, a handshake may be performed between the power converter 10-1 and the higher-level device 30 in accordance with the procedure defined in the communication protocol. Further, it is assumed that when the IP address is allocated, the IP address of the power converter 10-1 is notified to the higher-level device 30.

When the IP address is allocated, the higher-level device 30 transmits to the power converter 10-1 a reference request to refer to the register 101 in which the IP address list is stored (Step S4). In Step S4, the higher-level device 30 transmits the reference request including the address of the register 101 to be referred to.

When the power converter 10-1 receives the request, the control unit 11 executes a shell to copy the IP address list stored in the reference list L to the register 101 (Step S5). In Step S5, the control unit 11 copies the IP address list stored in the non-volatile memory of the storage unit 12 to the register 101 secured in the volatile memory of the storage unit 12.

The control unit 11 transmits to the higher-level device 30 the IP address list copied to the register 101 (Step S6). When the higher-level device 30 receives the IP address list transmitted in Step S6, the higher-level device 30 records the IP address list in the storage unit of the higher-level device 30. As a result, the higher-level device 30 can grasp the IP addresses of all the power converters 10 in the group, and can communicate with those power converters 10. However, the higher-level device 30 has not acquired the identification information on each power converter 10, and hence the higher-level device 30 acquires the identification information from each power converter 10 by the following processing and associates the acquired identification information with the IP addresses. As a result, the IP address and the identification information on each power converter 10 can be associated with each other even when the IP addresses are irregularly arranged in the register 101.

The higher-level device 30 transmits an identification information request to the power converter 10-1 (Step S7). In the case of copying the identification information to the register 101 of the power converter 10-1 and then transmitting the identification information request, in Step S8, the higher-level device 30 may transmit a reference request including the address of the register to be referred to.

When the power converter 10-1 receives the identification information request, the control unit 11 transmits the identification information on the power converter 10-1 (Step S8). In the case of copying the identification information to the register of the power converter 10-1 and then transmitting the identification information, the control unit 11 executes a shell. Through execution of the shell, the identification information including the identification number and serial number of the power converter 10-1 stored in the non-volatile memory of the storage unit 12 is copied to the register secured in the volatile memory of the storage unit 12, and the identification information is then transmitted. When the higher-level device 30 receives the identification information on the power converter 10-1 transmitted in Step S8, the higher-level device 30 records the received identification information in the storage unit of the higher-level device 30 in association with the IP address of the power converter 10-1.

Referring to FIG. 7, the higher-level device 30 transmits the identification information request to the power converter 10-2 (Step S9). In Step S9, the higher-level device 30 identifies the IP address of the power converter 10-2 based on the IP address list, and transmits an identification information request. When the power converter 10-1 directly connected to the higher-level device 30 receives the identification information request, the power converter 10-1 transfers the identification information request to the power converter 10-2.

When the power converter 10-2 receives the identification information request, the control unit 11 transmits the identification information on the power converter 10-2 (Step S10). The processing of Step S10 is the same as that of Step S8. When the power converter 10-1 receives the identification information on the power converter 10-2, the power converter 10-1 transfers the identification information to the higher-level device 30. When the higher-level device 30 receives the transferred identification information on the power converter 10-2, the higher-level device 30 records the transferred identification information in the storage unit of the higher-level device 30 in association with the IP address of the power converter 10-2.

Subsequently, in the same manner, the higher-level device 30 transmits an identification information request and receives the identification information up to the last power converter 10-N (Step S11 and Step S12). As a result of the processing described above, the higher-level device 30 can acquire the identification information on all of the power converters 10 in the group and associate the identification information with the IP addresses.

When the identification information on each power converter 10 has been transmitted to the higher-level device 30, the higher-level device 30 transmits an operating state request to acquire the operating state to the power converter 10-1 (Step S13). The operating state request is information having a predetermined format including an identifier indicating that the operating state is requested. When the operating state is stored in the register included in the power converter 10, the address of the register is stored in the operating state request.

When the power converter 10-1 receives the operating state request, the control unit 11 acquires the operating state of the power conversion unit 14 and transmits the operating state (Step S14). When the operating state of the power conversion unit 14 is stored in the register, the control unit 11 transmits the operating state stored in the register. When the higher-level device 30 receives the operating state of the power converter 10-1 transmitted in Step S14, the higher-level device 30 records the received operating state in the storage unit of the higher-level device 30.

The higher-level device 30 transmits the operating state request to the power converter 10-2 (Step S15). In Step S15, the higher-level device 30 identifies the IP address of the power converter 10-2 based on the IP address list, and transmits an operating state request. When the power converter 10-1 directly connected to the higher-level device 30 receives the operating state request, the power converter 10-1 transfers the operating state request to the power converter 10-2.

When the power converter 10-2 receives the operating state request, the control unit 11 acquires the operating state of the power conversion unit 14 and transmits the operating state (Step S16). The processing of Step S16 is the same as that of Step S14. When the power converter 10-1 directly connected to the power converter 10-2 receives the operating state of the power converter 10-2, the power converter 10-1 transfers the operating state to the higher-level device 30. When the higher-level device 30 receives the transferred operating state of the power converter 10-2, the higher-level device 30 records the transferred operating state in the storage unit of the higher-level device 30.

Subsequently, in the same manner, the higher-level device 30 transmits an operating state request and receives the operating state up to the last power converter 10-N (Step S17 and Step S18). As a result of the processing described above, the higher-level device 30 can acquire the operating states of all of the power converters 10 in the group and monitor the operating states.

According to the power conversion system 1 described above, an IP address list is generated by acquiring the IP address of each of a plurality of power converters 10 in the same group and being communicably connected to each other. The IP address list is transmitted to a higher-level device 30 cooperating with the plurality of power converters 10, and the higher-level device 30 grasps the IP address of each of the plurality of power converters 10. As a result, the plurality of power converters 10 and the higher-level device 30 can communicate with each other.

Further, with the configuration in which at least the power converter 10 directly connected to the higher-level device 30 transmits the IP address list to the higher-level device 30, the higher-level device 30 can grasp the IP address of each power converter 10 in the group even when the higher-level device 30 does grasp none of the IP addresses.

Further, through transmission of the IP address list by the power converter 10 when an IP address request transmitted in response to a predetermined operation at the higher-level device 30 is received, the IP address list can be acquired at a preferable timing for the administrator. For example, when the predetermined operation is performed subsequently after a new power converter 10 has added to the group or after a power converter 10 in the group has been replaced, the higher-level device 30 acquires the latest IP address list, and therefore the new power converter 10 or the replaced power converter 10 and the higher-level device 30 can communicate with each other.

Further, through transmission of the IP address list in initial communication with the higher-level device 30, the IP address list can be acquired when communication is established, and the subsequent communication can be reliably executed. For example, even when a new power converter 10 is added to the group or a power converter 10 in the group is replaced while the communication with the higher-level device 30 is disconnected, the latest IP address list is acquired by the higher-level device 30 during the subsequent initial communication, and therefore the new power converter 10 or the replaced power converter 10 and the higher-level device 30 can communicate with each other.

Further, through periodic transmission of the IP address list to the higher-level device 30, the higher-level device 30 can regularly acquire the latest IP address list. For example, even when a new power converter 10 is added to the group or a power converter 10 in the group is replaced, the higher-level device 30 regularly acquires the latest IP address list, and therefore the new power converter 10 or the replaced power converter 10 and the higher-level device 30 can communicate with each other.

Further, through transmission of the IP address list to the higher-level device 30 when the IP address list is stored in a predetermined register 101 and a reference request is received, when there is the reference request, the IP address list is transmitted as a response, and therefore the configuration for transmitting the IP address list can be simplified. If the IP address list is freely stored in any storage area of the power converter 10, the higher-level device 30 may manage the storage area of the IP address. According to the power conversion system 1, the higher-level device 30 does not need to manage the storage area because the IP address list is stored in the predetermined register 101.

Further, through separation of the list storage unit 100 and the storage area storing the IP address list, the operation of sharing the IP address and the operation of transmitting the IP address to the higher-level device 30 can be performed independently, and therefore an IP address transmission algorithm can be simplified.

Further, through copying of the IP address list to the register 101 just before transmission, even when the register 101 is in a volatile memory area, it is possible to prevent the IP address list from being lost due to the power interruption of the system.

Further, with the configuration in which each of the plurality of power converters 10 transmits own identification information (for example, identification number and serial number) to the higher-level device 30 after the IP address list is transmitted, the identification information on each of the plurality of power converters 10 can be grasped by the higher-level device 30, and can be used for monitoring the power converters 10 on the higher-level device 30 side.

Further, through assignment of an identification number to each of the plurality of power converters 10, sorting of the assigned identification numbers in ascending or descending order, and display of the operating state of each of the plurality of power converters 10, each information can be displayed in an easy-to-read manner.

Through dynamic allocation of an IP address to the higher-level device 30, communication between the plurality of power converters 10 and the higher-level device 30 can be easily enabled. Further, even when the higher-level device 30 does not grasp the IP address of any power converter 10, it is possible for the higher-level device 30 to grasp the IP address of the directly connected power converter 10 (in the case of the connection example of FIG. 1, the power converter 10-1) by using the DHCP function, and the IP addresses of the other power converters 10 can be grasped from the directly connected power converter 10.

5. Modification Examples

The present invention is not limited to the at least one embodiment described above, and can be modified suitably without departing from the spirit of the present invention.

Figure 8:
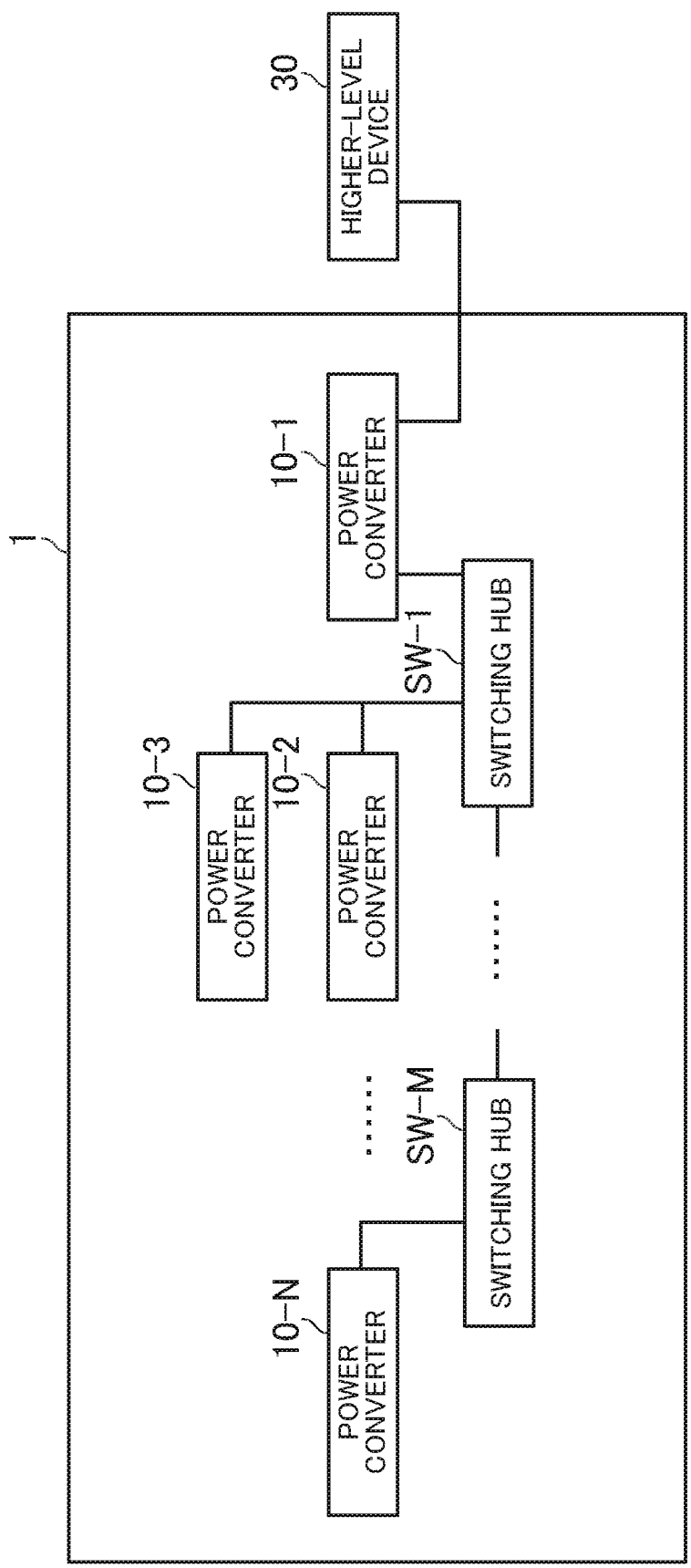
FIG. 8 is a diagram for illustrating an example of a connection form of power converters.

For example, as described in the at least one embodiment, the connection form of the power converter 10 is not limited to a daisy chain connection, and any connection form can be applied. FIG. 8 is a diagram for illustrating an example of a connection form of the power converters 10. As illustrated in FIG. 8, the power conversion system 1 includes switching hubs SW-1 to SW-M (M is a natural number), and each power converter 10 may be connected in a star shape. In the example of FIG. 8, the user terminal 20 is omitted. In the example of FIG. 8, the power converter 10-1 is directly connected to the higher-level device 30, and the lower-level communication port of the power converter 10-1 is connected to the switching hub SW-1 by a communication cable.

The power converters 10-2 and 10-3 are connected to a communication port of the switching hub SW-1. The power converters 10-2 and 10-3 are in a parallel relationship with each other, and are indirectly connected to the higher-level device 30 via the power converter 10-1. Further, the switching hub SW-1 is connected to another switching hub, and a power converter 10 having a lower connection order is connected to the another switching hub. For example, the power converter 10-N having the lowest connection order is connected to the switching hub SW-M, and is indirectly connected to the higher-level device 30 via the power converter 10-1.

Even in the case of a connection form like that illustrated in FIG. 8, similarly to the at least one embodiment, each power converter 10 stores the reference list L, and the IP address list is transmitted to the higher-level device 30. For example, when the power converter 10-1 receives a reference request from the higher-level device 30, the power converter 10-1 copies the IP address list to the register 101 of the power converter 10-1 and transmits the IP address list. The details of this series of processing steps are as described in the at least one embodiment. As described above, even for a star connection, the higher-level device 30 can acquire, via the power converter 10-1, the IP address list including the IP addresses of the other power converters 10-2 to 10-N having a connection order lower than the power converter 10-1.

Further, for example, the power converter 10 may transmit the IP address list without receiving an IP address request from the higher-level device 30. In this case, the power converter 10 may periodically transmit the IP address list, or may transmit the IP address list when the user performs a predetermined operation from the user terminal 20. Moreover, for example, the power converter 10 may autonomously transmit the IP address list as a part of a DHCP response during initial communication. In addition, for example, the power converter 10 may transmit the IP address list to the higher-level device 30 when the IP address list is updated. Further, for example, the list transmission module 105 may transmit the IP address list to the higher-level device 30 when a power converter 10 is added or replaced from the group setting screen G1.

Further, for example, the IP address request is not limited to be a request to refer to the register 101. For example, the power converter 10 may transmit the IP address list without copying the IP address list to the register 101. In this case, in place of a reference request to refer to the register 101, the IP address request is only required to include an identifier indicating that the IP address list is requested. Moreover, for example, the register 101 has been described as being external to the list storage unit 100, but the register 101 may be included in the list storage unit 100. In addition, for example, the register 101 may be provided in an external memory of the power converter 10 or may be secured in a memory of another computer.

Further, for example, the name of each power converter 10 may be assigned independently on the higher-level device 30 side. In this case, the administrator of the higher-level device 30 inputs the name of each power converter 10 from the operation unit 24. The input name of each power converter 10 may be recorded in association with the serial number and the IP address of the power converter 10. The higher-level device 30 may also be configured to record the identification number (name assigned by the user on the power conversion system 1 side) acquired from each power converter 10 and the name assigned by the administrator of the higher-level device 30 and link the two names in association with each other.

In the above-mentioned case, the administrator on the higher-level device 30 side can easily respond to an inquiry from the user. For example, even when the user makes an inquiry based on the identification number, which is a name given by the user, the administrator can immediately identify the power converter 10 where the inquiry is issued. Further, in the case of displaying the operating state of each power converter 10 on the higher-level device 30 side, the operating state of each power converter 10 may be displayed after the conversion of the identification number to the name assigned on the higher-level device 30 side. At that time, the operating state of each power converter 10 may be displayed by sorting the power converters 10 based on the names assigned on the higher-level device 30 side, or the power converters 10 may be sorted based on the names assigned on the power conversion system 1 side and the operating states may be apparently displayed based on the names assigned on the higher-level device 30 side.

Further, for example, each of the list storage unit 100, the register 101, the list generation module 102, the reception module 103, the copying module 104, the list transmission module 105, the identification information transmission module 106, and the allocation module 107 may be implemented by a computer other than the power converter 10. For example, a gateway server may be included in the power conversion system 1, and each power converter 10 may communicate with the higher-level device 30 via the gateway server. In this case, each of the above-mentioned functions may be implemented by the gateway server. In addition, for example, each of the above-mentioned functions may be implemented by another computer, for example, the user terminal 20.

The specific configurations in the at least one embodiment above are described as an example, and the invention disclosed in the present application is not limited to those specific configurations and data storage examples themselves. Various modifications may be made by a person skilled in the art to the disclosed at least one embodiment. For example, the shape and number of the physical components, data structure, or the execution order of processing may be changed, and it is to be understood that the technical scope of the invention disclosed in the present application cover all such modifications.

What is claimed is:

1. A power conversion system, comprising:
a plurality of power converters in a same group and being communicably connected to each other, the power conversion system being configured to:
acquire an IP address of each of the plurality of power converters from each of the plurality of power converters;
generate an IP address list that is a list of the IP addresses of each of the plurality of power converters;
transmit the IP address list to a higher-level device configured to cooperate with the plurality of power converters, the higher-lever device being indirectly connected to at least one of the plurality of power converters, the higher-level device being directly connected to the other power converters;
display, on a screen, an identification number assigned to each of the plurality of power converters and an operating state of each of the plurality of power converters the identification number being stored in each of the plurality of power converters, the indentification number being acquired from each of the plurality of power converters;
store a reference list including an identification number list of the identification numbers and the IP address list;

display, on the screen, a status that is information on whether each of the plurality of power converters is a power converter that has already been added to the group that shares information or is a new power converter that has not been added to the group that shares information;

display, when the status is changed by a user instruction, the changed status on the screen; and update the reference list based on the changed status.

2. The power conversion system according to claim 1, wherein at least the power converter directly connected to the higher-level device is configured to transmit the IP address list to the higher-level device.

3. The power conversion system according to claim 2, wherein the higher-level device is configured to transmit an IP address request when a predetermined operation is performed, and wherein the power conversion system is configured to:
receive the IP address request from the higher-level device; and
transmit, when the IP address request is received from the higher-level device, the IP address list to the higher-level device.

4. The power conversion system according to claim 2, wherein the higher-level device is configured to transmit an IP address request when initial communication is to be performed, and wherein the power conversion system is configured to:
receive the IP address request from the higher-level device; and
transmit, when the IP address request is received from the higher-level device, the IP address list to the higher-level device.

5. The power conversion system according to claim 2, wherein the higher-level device is configured to transmit an IP address request periodically, and wherein the power conversion system is configured to:
receive the IP address request from the higher-level device; and
transmit, when the IP address request is received from the higher-level device, the IP address list to the higher-level device.

6. The power conversion system according to claim 2, wherein the IP address list is stored in a predetermined register, and wherein the power conversion system is configured to:
receive from the higher-level device a reference request to refer to the predetermined register; and
transmit, when the reference request is received from the higher-level device, the IP address list to the higher-level device.

7. The power conversion system according to claim 1, wherein the higher-level device is configured to transmit an IP address request when a predetermined operation is performed, and wherein the power conversion system is configured to:
receive the IP address request from the higher-level device; and
transmit, when the IP address request is received from the higher-level device, the IP address list to the higher-level device.

8. The power conversion system according to claim 7, wherein the higher-level device is configured to transmit an IP address request list when initial communication is performed, and wherein the power conversion system is configured to:
receive the IP address request from the higher-level device; and
transmit, when the IP address request is received from the higher-level device, the IP address list to the higher-level device.

9. The power conversion system according to claim 7, wherein the higher-level device is configured to transmit an IP address request periodically, and wherein the power conversion system is configured to:
receive the IP address request from the higher-level device; and
transmit, when the IP address request is received from the higher-level device, the IP address list to the higher-level device.

10. The power conversion system according to claim 1, wherein the higher-level device is configured to transmit an IP address request when initial communication is performed, and wherein the power conversion system is configured to:
receive the IP address list request from the higher-level device; and
transmit, when the IP address request is received from the higher-level device, the IP address list to the higher-level device.

11. The power conversion system according to claim 10, wherein the higher-level device is configured to transmit an IP address request periodically, and wherein the power conversion system is configured to:
receive the IP address request from the higher-level device; and
transmit, when the IP address request is received from the higher-level device, the IP address list to the higher-level device.

12. The power conversion system according to claim 1, wherein the higher-level device is configured to transmit an IP address list request periodically, and wherein the power conversion system is configured to:
receive the IP address request from the higher-level device; and
transmit, when the IP address request is received from the higher-level device, the IP address list to the higher-level device.

13. The power conversion system according to claim 1, wherein the IP address list is stored in a predetermined register, and wherein the power conversion system is configured to:
receive from the higher-level device a reference request to refer to the predetermined register; and
transmit, when the reference request is received from the higher-level device, the IP address list to the higher-level device.

14. The power conversion system according to claim 13, wherein the power conversion system further comprises a storage area different from the predetermined register, and wherein the power conversion system is configured to copy the IP address list stored in the storage area to the predetermined register.

15. The power conversion system according to claim 14, wherein the power conversion system is configured to copy, when the reference request is received from the higher-level device, the IP address list to the predetermined register before transmission of the IP address list to the higher-level device.

16. The power conversion system according to claim 1, wherein each of the plurality of the power converters is configured to transmit its own identification information to the higher-level device after the IP address list has been transmitted.

17. The power conversion system according to claim 1, wherein the power conversion system is configured to sort the identification numbers assigned to each of the plurality of power converters in one of ascending order and descending order, and to display an operating state of each of the plurality of power converters.

18. The power conversion system according to claim 1,
    wherein the power conversion system is configured to dynamically allocate an IP address to the higher-level device, and
    wherein each of the plurality of power converters is configured to perform communication with the higher-level device based on the allocated IP address of the higher-level device.

19. A method of transmitting an IP address of a power converter, the method comprising:
    acquiring an IP address of each of a plurality of power converters in a same group and being communicably connected to each other from each of the plurality of power converters;
    generating an IP address list that is a list of the IP addresses of each of the plurality of power converters;
    transmitting the IP address list to a higher-level device configured to cooperate with the plurality of power converters, the higher-lever device being indirectly connected to at least one of the plurality of power converters, the higher-level device being directly connected to the other power converters;
    displaying, on a screen, an identification number assigned to each of the plurality of power converters and an operating state of each of the plurality of power converters on the screen, the identification number being stored in each of the plurality of power converters, the indentification number being acquired from each of the plurality of power converters;
    storing a reference list including an identification number list of the identification numbers and the IP address list;
    displaying, on the screen, a status that is information on whether each of the plurality of power converters is a power converter that has already been added to the group that shares information or is a new power converter that has not been added to the group that shares information;
    displaying, when the status is changed by a user instruction, the changed status on the screen; and
    update the reference list based on the changed status.

20. A non-transitory information storage medium having stored thereon a program for causing a computer to:
    acquire an IP address of each of the plurality of power converters in a same group and being communicably connected to each other from each of the plurality of power converters;
    generate an IP address list that is a list of the IP addresses of each of the plurality of power converters;
    transmit the IP address list to a higher-level device configured to cooperate with the plurality of power converters, the higher-lever device being indirectly connected to at least one of the plurality of power converters, the higher-level device being directly connected to the other power converters;
    display, on a screen, an identification number assigned to each of the plurality of power converters and an operating state of each of the plurality of power converters, the identification number being stored in each of the plurality of power converters, the indentification number being acquired from each of the plurality of power converters;
    store a reference list including an identification number list of the identification numbers and the IP address list;
    display, on the screen, a status that is information on whether each of the plurality of power converters is a power converter that has already been added to the group that shares information or is a new power converter that has not been added to the group that shares information;
    display, when the status is changed by a user instruction, the changed status on the screen; and
    update the reference list based on the changed status.

* * * * *